United States Patent [19]

Shofner

[11] 3,914,979

[45] Oct. 28, 1975

[54] SYSTEM FOR COLLECTING PARTICULATES FROM A FLUID MEDIUM

[75] Inventor: Frederick M. Shofner, Knoxville, Tenn.

[73] Assignee: Environmental Systems Corporation, Knoxville, Tenn.

[22] Filed: July 16, 1973

[21] Appl. No.: 379,229

[52] U.S. Cl. .................... 73/28; 55/270; 55/405; 55/465
[51] Int. Cl.² ................ G01N 31/00; B01D 53/30; B01D 45/00; B01D 45/14
[58] Field of Search ............ 55/270, 274, 404, 405, 55/465; 210/77; 73/28, 421.5 R

[56] References Cited
UNITED STATES PATENTS

| 3,587,323 | 6/1971 | Benjaminson et al. | 73/421.5 |
| 3,633,405 | 1/1972 | Noll | 73/28 |
| 3,681,973 | 8/1972 | Ludwig | 73/28 |

Primary Examiner—Frank A. Spear, Jr.
Assistant Examiner—Ferris H. Lander
Attorney, Agent, or Firm—Fitch, Even, Tabin & Luedeka

[57] ABSTRACT

A system for sampling particulates suspended in a fluid medium employing the principles of inertial impaction wherein a collector is moved through the fluid medium under conditions which cause impaction of the particulates on the collector and resultant capture of the particulates on the collector including means adapted to move the particulate-containing fluid medium as an elongated flow column, planar collector means disposed in the flow column and comprising a first plurality of elongated aligned filaments extending in a first direction in a plane, a further plurality of elongated aligned filaments extending in a second direction crossing the first direction and in the same plane as the first plurality of filaments, and defining a plurality of open passageways therebetween that communicate between opposite surfaces of the common plane, means releasably mounting the collector for revolution about an axis generally aligned with the length dimension of the flow column and with the common plane of the crossed filaments oriented substantially parallel to the length dimension of the flow column, and means adapted to revolve the collector about such axis, the rate of revolution of the collector relative to the rate of flow of the fluid medium being such that the movement of the collector defines a helical path through the fluid medium and the collector collides with and collects particulates from the fluid medium.

13 Claims, 8 Drawing Figures

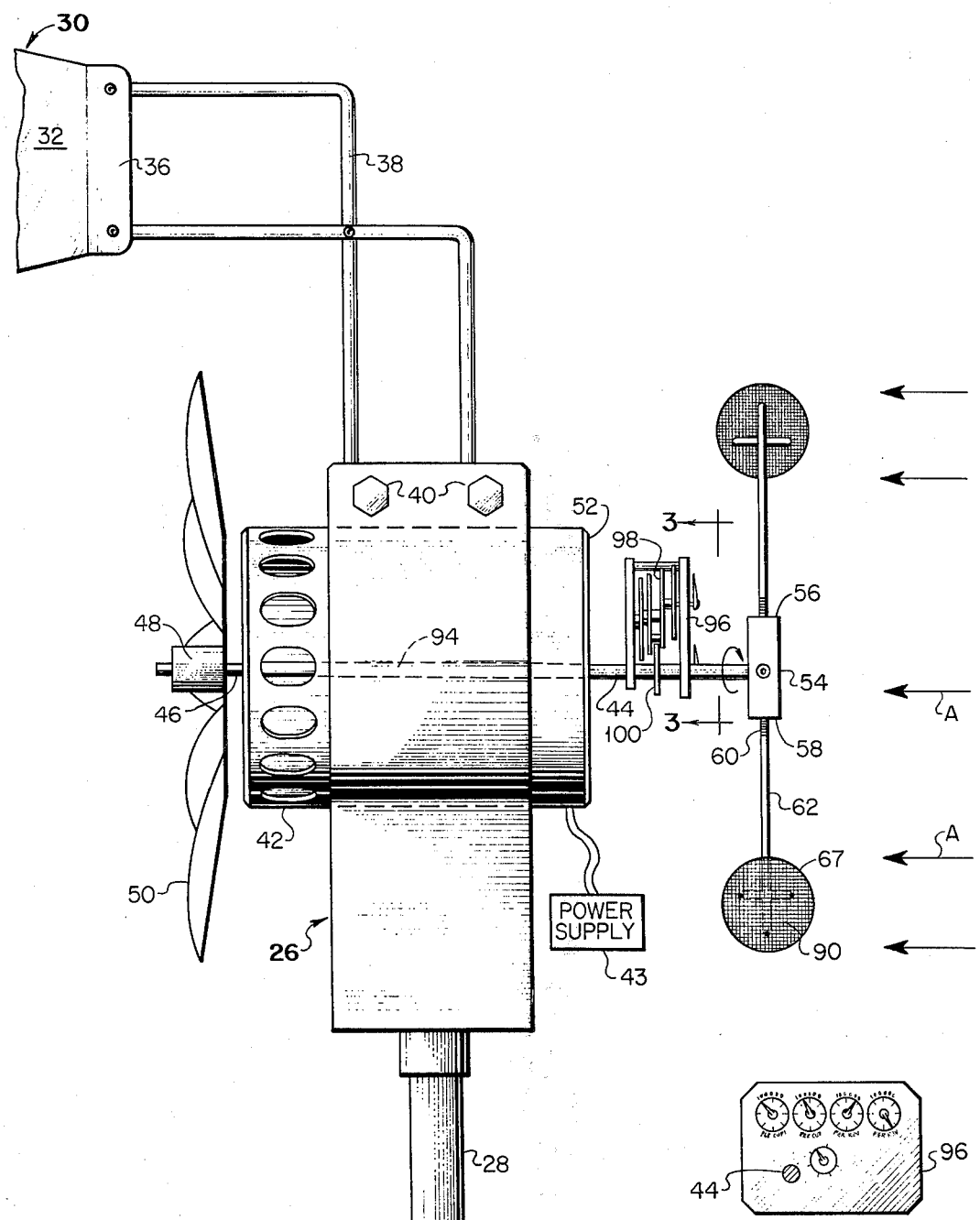
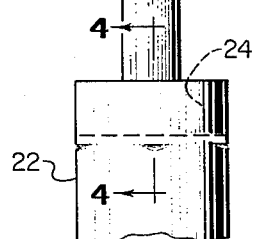
Fig. 2.
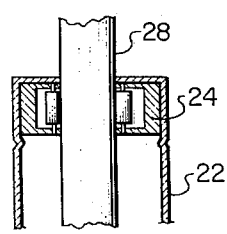
Fig. 3.
Fig. 4.

SYSTEM FOR COLLECTING PARTICULATES FROM A FLUID MEDIUM

This invention relates to methods and apparatus for sampling particulates suspended in a fluid medium. The invention is particularly suitable for sampling airborne particulates.

Increasing concern and interest has been expressed in airborne contamination, such as mineral laden droplets in the effluent from cooling towers of salt-bearing particulates born inland by winds from the ocean. Particular interest centers about those mineral-bearing particulates of a size which, after becoming airborne, settle out at a distant location where they are a contamination. Particulates of less than roughly about 1 micron diameter tend to remain airborne indefinitely and contribute little toward ground level deposition and resultant contamination. Larger particulates obviously contain larger quantities of the contaminant (e.g. mineral) so that for this reason as well as their greater propensity to settle out of their transport medium, sampling of these larger particulates is important. In any given particulate-containing fluid medium, the particulates may have a range of sizes so that it is necessary to collect both small and large particulates in any given sampling operation to insure that the sample contains substantially all of the contaminant that was present in the volume of medium sampled.

In analyzing the contaminating potential of a quantity of air, for example, it is the total quantity of mineral material (or other contaminant) in a unit volume of the air that is of importance. Such concentration may be expressed as grams of contaminant per cubic meter of air. It is required in the analysis, therefore, that the total volume of medium sampled be accurately known as well as knowing with assurance that substantially all the contaminant (whether in the form of small or large particulates) was collected from the volume of medium sampled.

Heretofore airborne particulates have been collected using the concept of impacting the particulates against a collector to accumulate the particulates on the collector, and thereafter analyzing the collected particulates for a specific contaminant, for example, sodium, calcium, chromium, and other materials. This impingement collection technique is referred to at times as inertial impaction.

These prior art devices have included relatively thin wires tautly stretched across the direction of prevailing winds so that particulates carried by the wind impinge upon the wire and adhere thereto. Wires of about 250 microns diameter and several feet long have been used in these devices. Similar wires of shorter length have been mounted on devices which rotate the wires in a contaminated fluid medium to cause the particulates in the fluid medium to strike the wires and collect thereon. In analyzing the particulates collected on the wires, it was necessary to have a knowledge of the length of the wire so that the volume of air sampled (that volume of air which passed by the wire) per unit of time could be obtained. The wires, therefore, had to be strung tautly so that their length could be accurately determined. This requirement made it difficult to remove the wires after the prescribed period of collection without losing or adding to the collected particulates on the wire. In any event, the total quantity of particulates which could be collected on any given wire was relatively small and insufficient for accurate analysis of the contaminating material found in the particulates. Other devices of the prior art included one or more rigid rods of varying diameter spun through the fluid medium. These rods presented similar problems relating to removing the collected particulates for analysis and to the lack of sufficient quantities of collected particulates for analysis. Still other devices included relatively large gauze sheets, for example 9 square feet in area, suspended between a pair of upright supports and disposed in the path of prevailing winds. Obviously, these gauze collecting devices were difficult to handle, particularly in removing the collected particles for analysis.

Known prior art devices for collecting airborne particulates by inertial impaction, are dependent upon natural wind flow, either to create the particle velocity necessary to cause particulates to impinge upon the collector with sufficient velocity as results in capture of the particulates on the collector, or to insure that the same volume of air is not resampled as in the case of a spinning collector. In addition, the known prior art devices were mounted in a fixed position so that the collection efficiency of the collector was highly dependent upon the wind direction. For example, a tautly stretched wire oriented parallel to the earth's surface would have reduced collection efficiency at all times except when the wind direction was substantially normal to the length of the wire. Still further, gathering the collected particulates from known prior art collectors of such devices for analysis purposes has presented substantial problems. It is to be recognized that the concentration of the contaminants referred to herein is very low, for example a few nanograms of contaminant per cubic meter of air, so that the presence of a human fingerprint against the collector could adversely affect the analysis and result in a false indication of contamination.

It is therefore an object of the present invention to provide a system for collecting particulates from a fluid medium. It is also an object to provide a novel collector for collecting particulates from a fluid medium by inertial impaction. It is also an object to provide a system of the type described which is independent of natural wind currents. It is another object to provide a system of the type described which has a high collection efficiency. It is another object to provide a system of the type described wherein the collector traces a helical path through the particulate-containing fluid medium. It is another object to provide a system of the type described wherein the collector is moved at substantially all times in a direction substantially normal to the direction of flow of the fluid medium. It is another object to provide improved apparatus for collecting particulates from a particulate-containing fluid medium and in which the collector is readily removed from the system for analysis purposes. It is another object to provide a novel method for collecting particulates from a particulate-containing fluid medium.

Other objects and advantages of the invention will be recognized from the following description, including the drawings in which:

FIG. 2 is a view of a sampling head including two revolving collectors;

FIG. 3 is a front view of a counter for recording revolutions of the collectors shown in FIG. 2.

FIG. 4 is a fragmentary sectional view taken along the line 4—4 of FIG. 3;

Generally stated, the present system employs the inertial impaction technique and includes means to move the fluid medium along an elongated flow path, collector means disposed in the flow column and comprising a first plurality of elongated aligned filaments extending in a first direction in a plane, a further plurality of elongated aligned filaments extending in a second direction crossing the first direction and in the same plane as the first plurality of filaments, and defining a plurality of open passageways therebetween that communicate between opposite surfaces of the common plane, means releasably mounting the planar collector for revolution about an axis generally aligned with the length dimension of the elongated flow path of the fluid medium and with the common plane of said crossed filaments oriented substantially parallel to the length dimension of the flow path, and means adapted to revolve the collector about the axis whereby the plane of the collector moves substantially normally with respect to the direction of movement of the fluid medium, the rate of revolution of the collector relative to the rate of flow of the fluid medium being such that the movement of the collector defines a nonoverlapping helical path through the fluid medium, whereby the collector collides with and collects particulates from the fluid medium. The collector with the particulates on it is removed and an analysis is made of the particulates.

Figure 1:
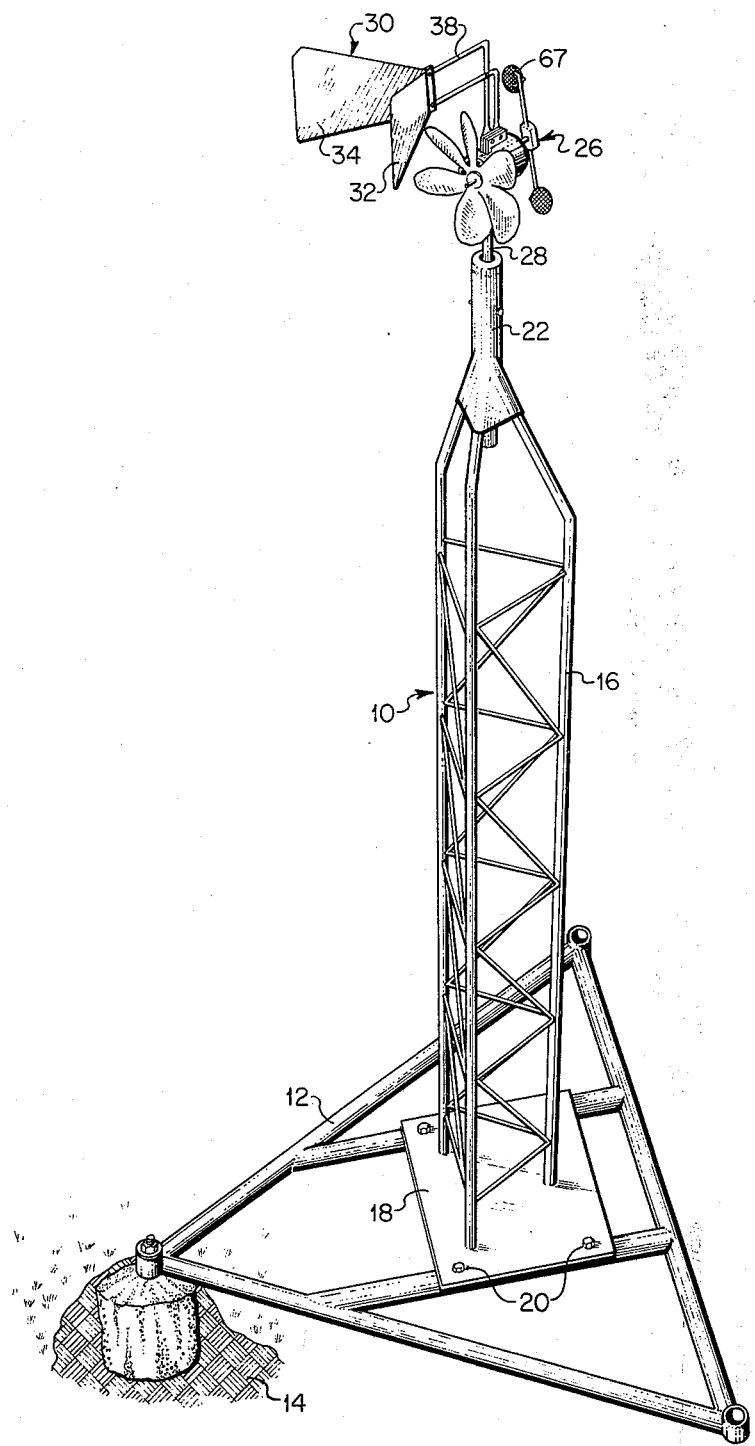
FIG. 1 is a representation of a system for collecting particulates and showing various features of the invention.

As illustrated in FIG. 1, the sampler 10 includes a base 12 adapted to anchor the sampler on a supporting surface such as the ground 14. The base 12 supports an upright tower 16 fixed to the base 12 as by a plate 18 on the bottom end of the tower which is fastened to the base by bolts 20. The tower 16 is of a height sufficient to prevent particulates from the ground being picked up during a sampling operation. Usually a tower height of 10 to 15 feet is sufficient for this purpose.

The top end of the illustrated tower terminates in a hollow cylindrical section 22 (see FIG. 2) which is fitted internally with a bearing 24. The sampler 10 further includes a sampling head 26 having a depending support shaft 28 that is received by the bearing 24 to rotatably support the sampling head 26 on the top end of the tower. As will be discussed further hereinafter, the sampling head 26 is provided with a vane 30 comprising a pair of diverging planar members 32, 34 that are oriented vertically with their apex 36 attached to a bent rod 38 that is secured to the sampling head by bolts 40. This vane 30 and the rotational mounting of the sampling head 26 in the top end of the tower 16 serve to maintain the sampling head oriented with respect to prevailing wind currents at all times.

The illustrated sampling head 26 includes an electric motor 42, connected to a source of power 43 preferably operable by either alternating or direct current to allow for operation of the motor from battery power when alternating current power is unavailable. Relatively small power is required from the motor and a 1/5 horsepower (hp) motor has been found suitable for most sampling operations. This small motor has small power requirements and can operate continuously for substantial periods of time while drawing power from conventional 12-volt automobile batteries. As much as 24 hours continuous operation of a 1/5 hp motor, hence 24 hours of sampling time, has been achieved using two 12-volt automobile batteries connected in series. The motor preferably is sealed to protect it from the elements.

The motor 42 has a shaft, portions of which extend from opposite ends of the motor. These shaft portions are referred to herein as front shaft 44 and rear shaft 46. Rear shaft 46 has a fan 48 mounted thereon for rotation with the shaft 46. The illustrated fan 48 has six blades 50 that are of a size and pitch such that rotation of the shaft 46 will cause the fan to move a predetermined volume of air per unit of time past the sampling head. The fan is of the counterclockwise type, that is, when facing the fan it rotates counterclockwise. The pitch of the blades is chosen to cause air to be pulled from the direction of the front shaft 44 (the front end 52 of the motor 42). This also moves the air in a path that defines a generally elongated column of moving air. As illustrated, the front shaft 44 is disposed in the approximate center of the moving air column and has its longitudinal axis aligned with the direction of air flow.

Figure 6:
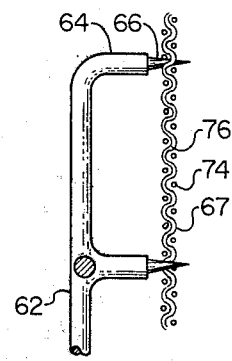
FIG. 6 is a view, in section, of a mounting for the collector.

The front shaft 44 has mounted thereon a connector block 54 that rotates with the shaft. Each of the opposite ends 56 and 58 of the block 54 are bored and tapped to receive the threaded end 60 of a rigid rod 62. The outboard end of each rod 62 is provided with a plurality of mounting lugs 64 (see FIG. 6) each of which extends normally from the rod 62 and terminates in a tapered spike 66. Preferably, the lugs 64 are relatively small in cross-section and spaced apart by a substantial distance to minimize their influence upon air flowing past them when the shaft 44 is rotated and the lugs 64 are caused to revolve about the axis of the shaft 44.

A planar collector 67 is mounted on the lugs 64 on the outboard end of each of the rods 62 with the plane of the collector aligned generally parallel to the length dimension of the air flow column. Each of the rods 62 is of a length such that the collector on its outboard end is kept within the moving air column so that as the collector 66 revolves about the axis of the shaft 44 as the shaft rotates it collides with and collects particulates from the air column.

Mounting of the collector 67 so that it can be readily removed for subsequent analyses of the collected particulates is accomplished by impaling the collector upon the spikes 66. Preferably the spikes 66 are tapered so that they each enter into an opening between adjacent filaments. Shoulder means 69 provided on each of the lugs 64 at the base of the tapered spike 66 provides a stop for limiting entry of the tapered spike into the open spaces between the filaments of the collector. In the preferred mounting the end of the rod 62 is provided with three spaced apart lugs as noted above. These lugs are located at points 120° apart to provide substantial support to the collector without substantially interfering adversely with flow of the fluid medium through the collector. This mounting means enables an operator to position the collector on the spikes using tweezers thereby avoiding handling and possible resultant contamination of the collector. After a period of sampling the collector is removed, again employing tweezers, and placed in a container, such as a Petri dish for transporting to a laboratory for anaylsis.

Figure 7:
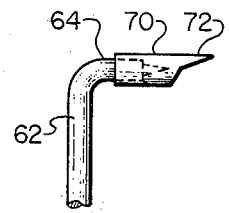
FIG. 7 is a view of an adaptor for the collector mount shown in FIG. 6.

Stainless steel spikes resist deterioration by the elements and do not contaminate the collector when the contaminant of interest is not a constituent of stainless steel. It has been found, however, that when collecting and analyzing chrome containing particles, the stainless steel spikes can contribute to the total chromium on the collector. As illustrated in FIG. 7, each of the lugs 64 is provided with a plastic boot 70 having a tapered point 72 to isolate the stainless steel lug 64 from the collector when chromium or other constituent of stainless steel is being collected. It is noted that the collector 67 does not require any mounting apparatus in contact therewith except the spikes referred to above. Also, the collector does not require means to maintain the filaments in their relative positions, but rather the collector is self-supporting and of sufficient rigidity as permits it to be used for repeated analyses.

Figure 5:
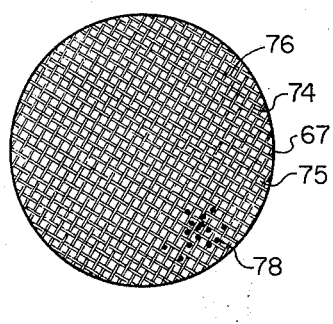
FIG. 5 is a representation, in plan, of a collector and showing a number of representative particulates in exaggerated size collected thereon.

The collector 67 illustrated in FIG. 5 comprises a first plurality of aligned elongated filaments 74 extending in a first direction in a plane (the plane of FIG. 5) and a second plurality of like elongated aligned filaments 76 extending in a second direction crossing the first direction and in the same plane as the first plurality of filaments 74, the crossed filaments defining openings 75 therebetween which communicate between the opposite faces of the collector. The filaments are unsupported except at their points of crossing. In the preferred embodiment, the first plurality of filaments 74 is woven with the second plurality of filaments in a one by one weave pattern. Each of the filaments of the collector is preferably of an elongated cylindrical geometry. This geometry provides the preferred flow pattern of a particulate-containing fluid medium past the collector with maximum inertial impaction of particulates upon the surface of the filament as the fluid medium flows past it. The size of each of the filaments in a collector is preferably the same as each other filament. The crossed filaments are cut into a disc-shaped collector to minimize unravel of the woven filaments. Contrary to the single strand collectors of the prior art, the collector 67 with its crossed filaments presents a concentrated surface area for impaction with particulates. The collector sweeps a path through the moving fluid medium that has a cross-section identical to the planar geometry of the collector. The collector is insensitive to the location of a particulate within the swept path in that the interfilamentary spaces between the aligned first plurality of filaments are filled effectively by the crossing second plurality of filaments. The swept path has substantially all particulates of interest removed by the collector. In addition, the crossed filaments provide a relatively large total area for impaction so that the total quantity of particulates accumulated is relatively large. A larger total quantity of particulates provides substantially more accuracy in the analytical procedures, thereby insuring that the reported concentration of a particular contaminant in the fluid medium is factual.

Plastic monofilaments, woven as noted, provide a suitable collector. For most analyses, monofilament polyester filaments are preferred because they are relatively inert and contribute minimal undesirable material in the usual analytical techniques used to determine the total quantity of one or more selected materials present in the collected particulates. Nylon filaments have been employed in collectors but these filaments introduce substantial undesirable foreign material, presumably from plasticizers or the like, into the analysis. Other plastic filaments, such as Teflon, also have been used in the collectors but the mechanical properties of such filaments are not as desirable as are the same properties of polyester monofilaments. For example, polyester monofilaments of about 500 microns diameter, when woven into a collector, define a substantially rigid planar collector which retains its geometry over long periods of repeated use. Such rigidity and integrity of the collector is important in preventing the centrifugal forces exerted upon the collector as it is revolved in a fluid medium from disintegrating the collector or from changing the filament orientation, including the interfilament spacing, such that the openings through the collector are changed with resultant adverse effect upon air flow through the collector or dislodgement of the collector from the mounting spikes.

Figure 8:
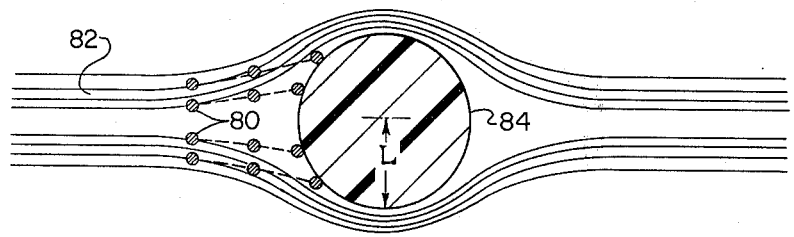
FIG. 8 is a representation of the flow of a particulate-containing fluid medium past an elongated cylindrical collector.

As illustrated in FIG. 8, inertial impaction indicates that particulates 80 in a fluid medium 82 moving toward a collector 84 follow the gas streamlines until they diverge around the collector. The moving particulates, because of their momentum, continue to move toward the collector, thus breakng through the streamlines and impacting against the collector. The relationship of these particulates, their fluid medium and velocity to the collector size is known as the inertial impaction parameter, K, and is defined by the equation:

$$K = \frac{\rho_p D_p^2 V_o}{18 \mu L} \qquad \text{Eq. (1)}$$

where:
  $\rho_p$ is the density of the particulate under consideration;
  $D_p$ is the diameter of the particulate;
  $V_o$ is the velocity of the particulate;
  $\mu$ is the viscosity of the fluid medium, and
  L is the half width of the cross section of an elongated collector disposed with its length across the flow direction of the particulate and measured in a direction substantially perpendicular to the flow.

This inertial impaction parameter is also defined as the ratio of the particulate stop distance (distance the particulate will penetrate into a still fluid when given an inertial velocity $\mu_o$) to the collector half width. The size of individual filaments in the collector 67 is ascertained employing the above equation. The collection efficiency of a cylindrical collector is a function of K and the velocity of the particulates, assuming a given particulate of a known size. The velocity of the particulate is established by the present system so that the inertial impaction parameter, K, is the controlling factor. It has been determined that values of K less than about 5, when collecting particulates of greater than about 1 micron diameter, result is less than desirable collection efficiencies, i.e. too many of the particulates escape collection. On the other hand, inertial impaction ceases to be a satisfactory collection technique when the particulate diameter is greater than about 1,000 microns.

It will be recognized that Equation (1) anticipates a fluid medium containing particulates of a given single size. In many analyses it is desired to collect particulates having a range of particle sizes. In the prior art where single filamentary collectors were employed, this did not constitute a problem inasmuch as the filament size was selected for maximum collection of the smallest particulate in the range. Larger particulates obviously would be collected on this filament if such appeared in the fluid streamlines because of their greater momentum and lesser tendency to flow around the collector. As noted there is a maximum particulate size which can be collected by impaction upon any given size filamentary collector in that particulates having a diameter approximately the same or greater than the diameter of the filamentary collector cross section will disintegrate upon impaction, with a portion of the particulate passing around the filament without being collected. In the present invention employing crossed filaments these larger particulates are of special significance in that the open area between the crossed filaments must be sufficiently great as prevents larger particulates from becoming entrapped in the openings between the cross filaments with resultant blocking of the openings. These openings cannot be so great, however, as to permit substantial numbers of the larger particulates to pass through the openings without impaction against one of the crossed filaments of the collector.

A collector was fabricated from crossed filaments, each of 500 microns diameter, in which the aligned filaments that extended in a first direction were spaced apart 1,500 microns from the center of one filament to the center of the adjacent filament. These filaments were crossed with a second plurality of like spaced apart aligned filaments. This collector had 44.5 percent open area between the filaments. This collector suitably collected at least about 90 percent of the particulates in air containing particulates ranging in size from 1 to 100 microns diameter. Representative particulates 78 accumulated on the collector 66 are depicted in exaggerated size in FIG. 5.

As illustrated in FIG. 2, the planar face 90 of the collector 67 is oriented substantially parallel to the longitudinal axis of the front shaft 44. The collector shown in FIG. 2 is revolved in a clockwise direction (as viewed from the right of FIG. 2) so that the orientation of the collector causes its planar face 90 to advance into the fluid medium that is moving in a column past the collector in the direction shown by arrows A in FIG. 2.

The rate of revolution of the collector 67 is correlated with the velocity of the fluid medium moved past the collector by the fan 48 so that the revolving collector describes a helical path through the moving fluid medium. The preferred helical path is nonoverlapping so that no substantial portion of the fluid medium is sampled twice, but rather the collector 67 at all times moves through "fresh" fluid medium. These correlated rates of movement preferably are not such that the helical path is stretched out, as by the fluid medium moving relatively fast past the collector (in the direction normal to the plane of revolution of the collector), in that such results in angles of impaction of particulates against the collector of substantially other than substantially normal to the planar face of the collector.

Accurate correlation of the rate of revolution of the collector and the velocity of the fluid medium moved past the collector is achieved in the illustrated embodiment by mounting the fan 48 and the connector block 54, hence collector 67, on opposite ends of a common shaft 94 of the motor 42. The capacity of the fan to move the fluid medium is fixed by its size, blade design and rate of rotation. Knowing these fixed values, the length of the rod 62 is set to provide that velocity at the center of the collector which, at the given rate of rotation of the shaft 94, will cause the revolving collector to travel the desired helical path through the flowing fluid medium. A system was made in which the shaft 94 of the motor 42 turned at the rate of 1,200 revolutions per minute (rpm). The fan design, at this rate of rotation, moved air past the collector at a velocity of 1.778 meters per second. A 4.44 centimeter diameter disc collector was mounted on the front end 44 of the motor shaft with the center of the collector located 11.43 centimeters from the center of the shaft. When the shaft turned at 1,200 rpm, the collector velocity (at its center) was 14.36 meters per second. These relative movements of the collector and fluid medium resulted in the collector defining a nonoverlapping closed helical path through the fluid medium.

The number of revolutions of the collector during a period of sampling is counted by a counter 96 (FIGS. 2 and 3) including a gear train 98, one of the gears 100 of which is fixed to the shaft 44. With a knowledge of the number of revolutions of a collector during a sampling operation and of the length of the orbit of the collector, the total length of the path traveled by the collector is calculated. The cross-sectional area swept by the planar collector is also known so that the total volume of fluid medium swept, i.e. sampled, by the collector is readily determined by conventional mathematics.

Following a period of sampling the collector 67 is carefully removed, placed in a Petri dish, and forwarded to a laboratory for analysis. In one analysis method, particularly suitable where sodium is the material sought, the collector, in the Petri dish, is washed with hydrochloric acid to dissolve the particulates. This solution is subsequently analyzed by atomic absorption techniques to determine the total quantity of sodium accumulated on the collector. Thus, the total quantity of sodium in the volume of fluid medium sampled is determined.

When sampling airborne contamination, the present sampling operation is independent of external wind currents so long as the air is at all times moving past the collector in a direction substantially parallel to the axis of the shaft 94. This is achieved through the use of the vane 30 which keeps the rotatable sampling head oriented at all times with respect to the wind so that the collector is headed into the wind and the direction of forced movement of the air by the fan is substantially parallel to the wind direction. In the preferred embodiment, the velocity of the air moved by the fan 48 is established higher than the maximum anticipated wind velocity so that the path traversed by the collector remains a substantially closed helix. Because the direction and velocity of air movement past the collector remain substantially constant, the direction of impingement of a particulate against the collector is kept substantially normal to the plane of the collector. The collection efficiency of the collector is thus kept high and not reduced by low angles of impingement.

The established velocity of the collector insures that the particulates in its path impinge against the collector with an impaction force that results in capture of the particulates on the collector irrespective of the wind velocity. This further insures that the collector sweeps its path of substantially all particulates, as compared to the prior art devices which depended upon erratic, if any, wind currents to move the particulates into contact with the collector. Consequently, the present system is substantially more reliable than known prior art devices.

While a preferred embodiment has been shown and described, it will be understood that there is no intent to limit the invention by such disclosure, but rather, it is intended to cover all modifications and alternate constructions falling within the spirit and scope of the invention as defined in the appended claims.

What is claimed is:

1. In an apparatus for sampling particulates suspended in a gaseous medium employing the principles of inertial impaction wherein a collector is moved through said medium under conditions which cause impaction of said particulates on said collector and resultant capture of said particulates on said collector the improvement comprising means adapted to move said particulate-containing medium as an elongated flow column, planar collector means disposed in said flow column and comprising a first plurality of elongated aligned filaments extending in a first direction in a plane, a further plurality of elongated aligned filaments extending in a second direction crossing said first plurality of filaments, and defining a plurality of open passageways therebetween that communicate between opposite surfaces of said common plane, means releasably mounting said crossed filaments for revolution about an axis generally aligned with the length dimension of said flow column and with the common plane of said crossed filaments oriented substantially parallel to said length dimension of said flow column, and means adapted to revolve said collector about said axis whereby said plane of said collector moves substantially normally with respect to the direction the movement of said medium, the rate of revolution of said collector relative to the rate of flow of said medium being such that said movement of said collector defines a non-overlapping helical path through said medium, whereby said collector collides with and collects particulates from said medium.

2. The apparatus of claim 1 and including means adapted to maintain said flow column in substantially parallel relation to flow currents of said fluid medium external to said flow column.

3. The apparatus of claim 1 and including means adapted to record the number of revolutions of said collector during a sampling period.

4. The apparatus of claim 1 wherein said means mounting said crossed filaments comprises a plurality of spaced apart tapered spikes inserted in and frictionally engaging spaced apart ones of said openings between said crossed filaments.

5. The apparatus of claim 4 and including a relatively chemically inert boot disposed over each of said spikes, said boot having a tapered projection extending therefrom for frictionally engaging one of said openings between said crossed filaments.

6. The apparatus of claim 1 wherein said first plurality of filaments is woven with said further plurality of filaments to define a self-supporting planar collector.

7. The apparatus of claim 1 wherein said means adapted to move said fluid medium comprises motor means including shaft means extending from opposite ends of said motor means and fan means mounted on one end of said shaft means adapted to pull said fluid medium past said motor means.

8. The apparatus of claim 7 and including means rotatably supporting said fan means substantially above a supporting surface whereby said flow column is kept free of particulate material present on said supporting surface.

9. The apparatus of claim 1 including two of said collector means, and arm means extending perpendicularly from opposite sides of said axis of revolution and receiving one of said collector means on each of its outboard ends.

10. In a system for extracting particulates from a gaseous medium containing said particulates suspended therein employing the principles of inertial impaction the improvement comprising collector means comprising a first plurality of aligned filaments extending in a first direction in a plane, a further plurality of aligned filaments extending in a second direction in said plane and crossing said first plurality of filaments, each of said filaments being unsupported except at its points of crossing with another filament, said crossed filaments defining a plurality of openings therebetween that communicate between opposite sides of said plane, each of said filaments having a half width, L, that satisfies the equation $$L = \frac{\rho_p D_p 2 V_o}{18 \mu K}$$

where $\rho_p$ is the density of the particle being sampled;

$D_p$ is the diameter of the particle being sampled;

$V_o$ is the velocity of the particle being sampled;

$\mu$ is the viscosity of the fluid medium that contains the particles, and $K$ is the inertial impaction parameter and has a value of at least about 5.

11. The system of claim 10 wherein each of said filaments is a polyester monofilament.

12. The system of claim 10 wherein said openings define an open area of at least 40 percent of the area of a planar face of said collector means.

13. A method for sampling particulates suspended in a gaseous medium comprising the steps of moving said particulate-containing medium in an elongated flow column, disposing a planar foraminous collector within said flow column with the planar face of said collector aligned substantially parallel with the length dimension of said flow column, and revolving said collector about an axis that is substantially parallel to the length dimension of said flow column at a rate such that the movement of said collector relative to said flowing medium defines a non-overlapping helical path through said flowing medium, said revolution of said collector causing said collector to impinge and collect particles occurring within said helical path.

* * * * *